Patented Dec. 9, 1941

REISSUED
APR 7- 1942

2,265,863

UNITED STATES PATENT OFFICE 2,265,863

BLAST FURNACE TREATMENT OF LOW GRADE MANGANESE-IRON ORE

Percy H. Royster, Bethesda, Md.

No Drawing. Application October 13, 1938,
Serial No. 234,847

7 Claims. (Cl. 75—31)

This invention relates to the pyrometallurgy of oxidic ores containing substantial amounts both of iron and of manganese, as opposed to ordinary iron ore containing only a few percent (e. g., 3% or less) of manganese compounds, and is concerned with the provision of an improved method of smelting oxidic manganese-iron ore in the blast furnace for the production of a metal and of an artificial manganese ore low in iron.

In my copending application for U. S. Letters Patent Serial No. 234,848 filed October 13, 1938, there is described a process of working up ores of the above description, said process consisting essentially in a blast furnace treatment of the ore with solid fuel, the process being characterized by the employment of (1) a fuel-to-ore ratio materially lower than is conventional in blast furnace practice, and (2) a highly preheated blast (e. g., an air blast at above 1800° F.), the total heat supplied to the charge (from combustion of the fuel plus sensible heat derived from the blast) being adjusted to and maintained at a value sufficient to discharge as liquid products the resulting reduced metal (e. g., pig iron) and the resulting artificial ore (slag) but insufficient to bring about metallization of the greater part of the manganese content of the starting material. The metal may contain a minor amount of manganese. The slag (or "artificial manganese ore") product may contain larger amounts of $SiO_2$ and $Al_2O_3$ than the usual grades of manganese ore, a small amount of FeO and the greater part of the manganese of the starting material.

Satisfactory operation of that process under blast furnace conditions can be realized economically with high blast temperatures provided the ore-to-fuel ratio is increased in the charge until the hearth temperature is reduced to the unusually low range 2000° F. to 2370° F. Even at 2420° F. I have found in actual practice that I can produce metal with as low as 1.75% Mn, i. e., a metallization of 5.3% of the manganese in the charge and a retention in the slag of about 94.7% of the charged manganese.

By the expression "hearth temperature" I mean the algebraic average of the temperatures observed with an optical pyrometer (corrected for emissivity) sighted on the emergent streams of metal and slag at "cast" and "flush," respectively.

The inventive object of the above described process is the provision of thermal and chemical conditions in a blast furnace hearth favoring the selective reduction of iron oxide.

The present invention has the same practical objectives as has the invention of the aforesaid copending patent application. Thus, it is an object of the present invention to provide conditions of blast furnace operation which shall effect the selective reduction of iron from an oxidic manganese-iron ore so as to produce a metal and a slag of such relative contents of MnO and FeO as to amount to an "artificial manganese ore."

According to the improved process of the present invention, however, I treat oxidic manganese-iron ore in a blast furnace under non-equilibrium or "upset" conditions of operation by impairing the intensity of reduction in the hearth and by so altering the chemical, physical and metallurgical conditions of usual practice that the effectiveness of the blast furnace hearth, ordinarily such a strongly reducing agent, is depreciated. The present process may be characterized as a blast furnace operation purposefully carried out under conditions inimical to the attainment of thermodynamic equilibrium. That is to say, I so limit the time, the degree of chemical contact, and the distribution of heat and of materials, that the free energy of reduction in the furnace hearth is diminished, to the end that the FeO content of the slag emerging from the furnace is higher than would result from attainment of thermodynamic equilibrium.

In effecting notable departure from equilibrium conditions I may employ one, or another, or a combination of two or more, of the following measures:

1. Overburdening the furnace by the maintenance of too high an ore to fuel ratio;
2. Non-uniformly distributing the charge on the stock line;
3. Maintaining too short a stock column;
4. Using poor coke;
5. Maintaining the slag level in the hearth higher than customary;
6. Causing the "oxidizing zone" or zone of coke combustion to cover a larger fraction of the furnace hearth area than is customary;
7. Operating with a charge which yields a slag low in CaO and MgO but high in iron and/or manganese;
8. Increasing the moisture content of the blast above normal.

A fuller explanation of these measures follows:
1. Overburdening is most frequently and readily indicated by the appearance of a "scouring slag"—i. e., a black slag relatively high in FeO— and by the concurrent production of pig iron of poor analysis, low in silicon and high in sulphur. In conventional blast furnace practice overburdening and the consequent occurrence of scouring slag is avoided but may inadvertently occur. In the present process, however, I may purposefully overburden in order to produce a slag intentionally high in FeO, in order to maintain the desired departure from equilibrium conditions.

2. Non-uniform distribution of ore and fuel on the stock line causes the charge to descend in an irregular manner, permits the ascending gas stream to channel, and results in the injection into the bosh, tuyère zone and hearth of incompletely treated ore, thereby adversely affecting the reduction efficiency of the hearth. In conventional blast furnace practice non-uniform distribution of ore and fuel on the stock line is avoided: in the present process, however, I may purposefully and desirably impair the reduction efficiency of the hearth in this manner.

3. Allowing the level of the charge to descend too low in the furnace shaft reduces the length of the path of travel of the ore and fuel and, concurrently, the period of time within which the charge remains in chemical and thermal contact with the hot reducing gas ascending through the furnace. Thereby, the furnace is prevented in part from exercising its normal metallurgical effect as a strong reducing means, and "raw ore" (i. e., incompletely reduced iron oxide) arrives in the slag bath, "upsetting" the furnace operation as indicated by the appearance of one, two or three percent of FeO in the slag. While this would not, of course, be economically desirable in conventional blast furnace practice, I may purposefully effect this measure in order to control hearth conditions.

4. Charging coke of poor combustibility—due to (a) low porosity, (b) improper coking, (c) high ash content, (d) defective cell structure or (e) abnormal graphitization of carbon—likewise has an adverse effect on reduction. With reduced coke combustibility, the fraction of the furnace hearth area in which the oxidizing gases $O_2$, $CO_2$ and $H_2O$ exist is increased and the FeO content of the slag is elevated above its equilibrium value and above that value sought in conventional blast furnace practice.

5. The effect of carrying the slag bath high in the hearth so that its surface is held in chemically reactive contact with the oxidizing gases existing in the combustion zones adjacent to the tuyères is to decrease the intensity of reduction in the hearth and to increase retention of the manganese in the slag. This measure includes, in the extreme case, carrying the upper surface of the slag bath in contact with, or even above, the tuyère level, so as positively to effect bubbling of air through the liquid slag. Metallurgically, I am here carrying out, to some extent, a Bessemerizing process in the neighborhood of the tuyères and pneumatically oxidizing the manganese content of the metal and concurrently raising the FeO content of the slag above its equilibrium value.

6. By increasing the jet velocity of the air blast through the tuyères sufficiently, I have found that I can cause (a) lumps of coke to be blown bodily away from the immediate vicinity of the blast entrance and (b) the oxidizing zone to extend farther than usual into the furnace, thereby subjecting an enhanced fraction of the hearth contents to oxidation.

7. There are two important physical characteristics of a blast furnace slag which affect the furnace operation, (a) its viscosity and (b) its "wetting" property toward coke.

When the slag viscosity is too high, the slag does not flow freely through the bosh and into the hearth and this sluggishness of slag flow causes an accummulation of incombustible material in the combustion zone. As a result, the oxidizing zone contiguous to the tuyères extends to cover an enlarged fraction of the hearth, the intensity of reduction there is increased, and the FeO in the slag is maintained at the desired concentration.

Apart from viscosity considerations, slags containing substantial amounts of iron and manganese and relatively small amounts of CaO and MgO show an adhesion for coke carbon.

Basic or even slightly acid slags do not "wet" coke carbon to any material extent but slags low in lime and magnesia and carrying a considerable amount of manganese silicates have a tendency to adhere to coke carbon. That is to say, they form liquid films which "wet" the coke and impair its combustibility. In the present process it is desirable to operate the furnace with a charge which yields a type of slag which will effect a certain amount of "coke wetting."

8. Increasing the water content of the blast above normal moisture content, i. e., operating with a wetted blast, is a powerful means of impairing the intensity of hearth reduction. Introduction of water, e. g., as a liquid spray or as live steam, in controlled amount, into the blast, is easily effected in practice, and functions in a manner counter to that of a dried blast.

The present invention is defined specifically as a blast furnace operation wherein a substantial departure from equilibrium conditions is enforced. I have found that it is possible to effect the desired departure from equilibrium by employing suitably a variety of operating factors, inimicable to thermodynamic equilibrium, such as the eight measures above listed.

Each of the several measures above described, either alone or in combination, when used under proper control, is directed to the one end of limiting the fundamentally high intensity of reduction that exists in the hearth of a normally operated blast furnace, for the express purpose of effecting a departure from equilibrium which results in suppression of manganese metallization and enhancement of the FeO content of the slag. Adoption of any one of the eight measures enumerated above or others of like effect, makes possible raising the FeO content of the slag above equilibrium value (i. e., a fraction of one per cent at usual blast temperatures), up to, say, one, two, or more, per cent.

The process of the present invention makes possible the maintenance of a higher FeO value in the slag than thermodynamic equilibrium requires, i. e., the maintenance of non-equilibrium conditions. By thus maintaining a high FeO value in the slag I depress the Mn content of the pig iron and hence effect satisfactory retention of MnO in the slag even when operating with such relatively high slag, metal and hearth temperatures as are normal in conventional blast furnace practice.

The objectives of the present invention can, in general, be realized with blast temperatures as low as 1000° F. However, with slag temperatures as high as 2730° F., and with blast temperatures below 1000° F., a relatively high ratio of fuel to ore is required in order to keep the furnace in operation. Although I do not wish to limit the process of the present invention to any minimum blast temperature, in the sense that I am able to make the process operate with cold blast, I have found that the economy of the process and the operation of the furnace are greatly improved by employment of relatively high blast temperatures. For economical reasons, I prefer to use blast temperatures above 1800° F. In fact, I have found that with blast temperatures in excess of 2000° F., e. g., from 2200° to 2600° F., it is practically impossible to produce furnace difficulties by an indiscretion in the carrying out of the process since the slag produced is quite fluid at 2300° F. and the freezing point of the metal produced is below 2200° F.

No special skill or experience is required for the carrying out of this process. With any given oxidic manganese-iron ore, coke, burden and furnace, and with high blast temperature available, the furnace can be put into operation according to conventional blast furnace principles. Analysis of Mn in the metal and of FeO in the slag should be taken, and likewise optical pyrometer readings of the temperatures of the slag at flush and the metal at cast. If the temperature of the slag at flush is too high (e. g., above 2600 F.), and if Mn in the metal is high (e. g., 4 or 5%), indicating an undesired loss of Mn from the slag, and conjugately if the FeO content of the slag is lower than the limit established for the required Mn-to-Fe ratio needed for "ferro" production (e. g., above 3 or 4%), the reducing conditions of the hearth are obviously too intense and one or more of the several special measures, above described, for increasing the FeO content of the slag is or are practiced, and prompt analysis of the FeO content of the slag made at each flush. As the FeO is increased and the Mn content of the pig iron depressed, the economy of the process can be used as criterion for determining the optimum FeO content. The maximum value of FeO in the slag is fixed by the ratio of MnO to FeO in it, in order that the slag shall have the "artificial manganese ore" characteristics above mentioned and be within the "ferro" limit (i. e., capable of smelting, in a subsequent operation, to ferromanganese). The ratio of Mn to Fe in the slag should not be less than 8 to 1, for 80% ferromanganese and, in general, should be 12 or 14 to 1. On the other hand, the minimum limit of FeO in the slag will depend upon the maximum tolerance of manganese in the metal. As a general observation, it may be stated that the Mn in the metal may desirably be held between 0.5% to 1.0% as a lower limit and 3.5% to 4.0% as an upper limit, and the MnO retained in the slag may desirably amount at least to 70% of the total manganese content of the ore and preferably should amount to from 85% to 95% thereof.

The following specific examples are added to the foregoing description by way of illustration only. The invention is not limited to the specific conditions enumerated therein, except as may be indicated in the appended claims.

I may employ a blast furnace of usual design, 86' tall from iron notch to lip ring of the bell, with a charge column measuring 72' vertically from the center line of the tuyères to the normal stock line: the furnace has a hearth diameter of 14'6", a bosh diameter of 19'0", a bosh angle of 76°, and a stock line diameter of 12'6". The active volume of the charge column (between tuyère plane and stock line) is 14,850 cu. ft., Each 20-minute round of 28,000 lbs. of ore and 7175 lbs. of coke occupies a volume of 436 cu. ft., and forms a layer on the stock line 43" thick (average). The average time of passage of the charge through the furnace, herein called "time of passage," is 10 hours 30 minutes. The stock line descends at an average rate of 2.15 inches per minute. The furnace is provided with a "McKee top," with rotating distributor, which device may be adjusted to rotate on a predetermined schedule. In conventional practice this device is so adjusted as to provide for uniform distribution of the charge ingredients on the stock line (i. e., "peripheral symmetry" of charge).

I charge into this blast furnace, at 20-minute intervals, rounds or charges consisting of 28,000 lbs. of oxidic manganese-iron ore and 7175 lbs. of coke, and no limestone. Analyses of the ore and coke charged are:

| Ore 6,350 lbs./ton | | Coke 1,568 lbs./ton | |
|---|---|---|---|
| Fe | 33.00 | Moisture | 1.50 |
| Mn | 11.56 | Volatile | |
| P | 0.205 | matter | 1.20 |
| SiO$_2$ | 8.1 | Ash | 4.50 |
| Al$_2$O$_3$ | 2.15 | Fixed carbon | 92.80 |
| CaO | 0.73 | S | 0.45 |
| MgO | 0.34 | Fe | 0.78 |
| CO$_2$ | 0.41 | SiO$_2$ | 2.19 |
| Combined | | Al$_2$O$_3$ | 1.06 |
| H$_2$O | 7.89 | CaO | 0.28 |
| Moisture | 14.50 | Nitrogen | 0.35 |

I blow this furnace of 16,680 cu. ft. with air preheated to 1900° F. In this operation I produce daily 318 long tons of pig iron and 240 long tons of slag. The metal analyzes: Si, 0.25%; S, 0.07; P, .59; Mn, 2.20; C, 3.85; Fe, 93.04. The slag analyzes: SiO$_2$, 31.40%; Al$_2$O$_3$, 9.05; CaO, 2.96; MgO, 1.25; FeO, 3.50; MnO, 51.66; S, 0.31; P$_2$O$_5$, less than 0.03. The temperature of the emergent metal was 2700° F., and that of the slag was 2780° F.

At the hearth temperature realized in the above illustrative example, had there been a reasonable approach to thermodynamic equilibrium, the FeO of the slag would have been much lower (less than 1%, for example) and the manganese in the metal would have been four or five per cent.

I was able to produce the above described results, which represented a marked departure from equilibrium results, by a variety of means. For example, in one mode of carrying out the process of the invention I effect non-uniform distribution of the stock on the stock line. I have found that this may be done, using a furnace provided with the type of top above described, by imparting to the charge ingredients a selected asymmetry or peripheral non-uniformity through appropriate predetermined adjustment of the schedule of the distributor. Thus, for example, the distributor may be so rotated as to deposit 17,000 lbs. of the total ore of one round in the first hemicircle and only 1,000 lbs. of ore in the second hemicircle. Coke deposition, in accordance with this example, is similarly affected, 2872 lbs. thereof being deposited in the first hemicircle and 4303 lbs. thereof being deposited in the second hemicircle. Thus, the ratio of ore to coke in the first hemicircle of the stock line is 5.92 to 1, whereas it is only 2.55 to 1 in the second hemicircle, although the total ore (28,000 lbs.) and the total coke (7175 lbs.) have the ratio 3.90 to 1.

By the above distribution I have, in effect, overburdened the first hemicircle of the furnace and "underburdened" the second half. If all of the iron in that portion of the charge lying in the first half were metallized, it would mean that only 1025 lbs. of coke had been consumed per ton of pig iron produced. However, this half of the furnace, under the conditions described, is not able to metallize all of the iron therein because of the under-fueling, and the melted ore runs into the hearth with from 10 to 12% of FeO remaining unreduced. Simultaneously, in the second half of the furnace, where coke is in great excess, iron is metallized with a consumption of 2400 lbs. of coke per ton of metal produced. This latter, under the conditions described, is a semi-spiegel showing from 8 to 10% Mn and Si in excess of 1%. The slag flowing into the hearth on this same side has a very low content of FeO.

As the metals from the respective halves of the furnace flow into the hearth they commingle and diffuse, yielding a metal bath indicating 4 to 5% Mn.

In like manner, the slag (substantially free from FeO) from second side, commingles with the oxidizing, "high-iron", scouring slag from the first half, and by admixture and diffusion yields a slag containing from 5 to 6% FeO.

Chemical reaction between the FeO of the slag and Mn of the metal takes place according to Equation 1, and although heat is generated by the exothermic reaction, tending to elevate metal and slag temperatures and thereby to lower the FeO content of the slag, I have found that opportunity is not afforded for the two liquids to attain thermodynamic equilibrium and thus that the desired objective is effected.

In an alternative procedure, while employing conventional symmetrical distribution at the stock line, I impair the reduction efficiency of the hearth by dropping the stock line a considerable distance below the level conventionally adhered to. For example, by protraction of the interval of each round to 30 minutes (instead of 20 minutes) the level of the top of the stock line is caused to move down in the furnace 0.7" per minute. By maintaining this retarded charging schedule for 12 hours, I drop the stock line 42', after which event charging at 20 minute intervals is resumed. With this low stock line (30', as opposed to the former 72'), the average time of passage is decreased from 10 hours 30 minutes to about 5 hours. This shortening of the charge column is sufficient to cause injection of "raw ore" into the furnace hearth, thereby diminishing the normally high intensity of reduction of the hearth and insuring the desired retention in the slag of most of the Mn content of the oxidic manganese-iron ore in non-metallized form and the production of metal containing Mn less than 4%.

Because of the variables encountered (e. g., the reducibility, porosity, density, composition, moisture content, etc., of the particular ore, especially the "combined water", the clay content, and the "caking" or agglomerating characteristics of the ore, the characteristics of the fuel, etc.) no quantitative formula for shortening the "time of passage" can be laid down. However, one skilled in the art may, by analyses of the metal and slag, and observation of the slag and metal temperatures, readily determine the optimum stock line level for any "new" or previously untried oxidic manganese-iron ore and thereafter proceed in accordance with the above principle. It may be remarked here that observance of this embodiment of the invention makes possible a material shortening of the stack of a furnace to be built for carrying out this process, thereby effecting a saving in the cost of the furnace per se, and a lowering of the pressure required to blow the wind into the furnace (i. e., further savings in investment and operating costs in the engine room).

As a third alternative procedure, I maintain conventional symmetrical distribution on the stock line, maintain the level of the stock line at 72' above the tuyères, but upset the charge column descent by employing an asymmetrical tuyère system. Thus, in the case of an existing blast furnace provided with 8 symmetrically arranged tuyères each 4" in diameter, total tuyère cross-sectional area 0.695 sq. ft., I replace the tuyères on the first hemicircle with tuyères 4⅝" in diameter and on the second hemicircle with tuyères 3¼" in diameter. The new tuyères have the same total area as the replaced tuyères, but two-thirds of the wind is now blown in at the first hemicircle and only one-third thereof at the second hemicircle. This causes the rate of coke consumption in the first hemicircle to be doubled, and the rate of descent of the stock column in that half proceeds twice as fast as in the other half. Accordingly, the stock line, even though the charge had been deposited in a uniform manner at the stock line, is caused to "dip" or become inclined to such an extent that when the average level has descended about 10' the plane of the round is inclined about 35° from the horizontal. The end result of this operation is the same as that flowing from asymmetrical distribution (first example above) and as that flowing from dropping the stock line (second example above).

The inventive objective may, I have found, be reached, with better all-around results, with more opportunity for nice control and with less liability to error due to the "personal equation," by combining the features (1) a moderate drop in stock line level (15' to 20'), and (2) a limited asymmetry of stock distribution on the stock line (e. g., 5% excess of ore on one side over that on the other side, and 5% excess of coke on the latter over that on the former), with (3) the employment of tuyères of 4¼" diameter on one side of the furnace and tuyères of 3¾" diameter on the other side. These individually less drastic measures combine desirably to bring about injection of suitable amounts of FeO into the hearth with consequent diminution of the intensity of reduction in the latter and the promotion of a slag containing by far the greater part of the manganese of the charge in non-metallized form.

In cooperation with any one or more of the above illustrated measures, (e. g., in cooperation with the combination described immediately above) I may and preferably do employ the measure of oxidizing the slag directly with the blast. I control the average upper level of the slag bath, preferably through the agency of a plurality of cinder notches, with associated coolers and monkeys, located at differing distances below the tuyère level, so that the same is in close proximity to the blast entrance. Thus, I may place the topmost cinder notch within 24", or less, of the center line of the tuyères, and dispose one or, preferably, more cinder notches at spaced intervals therebeneath.

It has been shown that, with run-of-the-oven coke, oxygen gas is found as far as 16" to 20" from the blast entrance, and that $CO_2$, in an amount giving a ratio of $CO_2$ to $CO$ as great as 0.25 to 1 (which amount, at hearth temperature, is oxidizing in the reaction $Fe+CO_2=FeO+CO$) as far as 26" to 30" inwardly from the tuyère nose. Hence, by carrying the slag bath upper surface within 26" to 30" from the tuyère the former is directly subjected to gases containing a sufficient proportion of $CO_2$ to $CO$ to oxidize some of the iron to $FeO$. When I carry the slag level within 16" to 20" from the tuyère nose the slag encounters gases containing $CO_2$ and $O_2$, which gases can and do oxidize some of the FeO to $Fe_3O_4$, thereby further enhancing the oxidizing intensity of the slag.

Considerable decrease in intensity of reduction in the furnace hearth may be effected by treating some or all of the coke of the charge as follows: The coke, as formed, is quenched in an aqueous slurry of clay or other incombustible inert mineral matter, the relative amount of such mineral matter being adjusted so that the coke when dried carries a thin coating of the mineral matter. I have found that such coatings inhibit prompt combustion of the coke in the latter's arrival in the tuyère zone, and hence diminish reduction intensity.

The use of coke in large lumps serves to extend the dimensions of the combustion zone and therefore to diminish the intensity of reduction in the furnace hearth. The linear dimensions of the combustion zone are almost directly proportional to the linear dimensions of the coke lumps.

An equally effective means of extending the dimensions of the combustion zone is the employment of higher jet velocities of the incoming air. I have found that when the jet velocity of the tuyère is increased to an extent such that lumps of coke are blown away from the tuyère nose the intensity of hearth reduction is measurably reduced. Thus, with 2100 cu. ft./min. of air (measured at 60° F. and 30" Hg.) blown through each of the eight 4" tuyères, at 1900° F. hot blast and 14 lbs. gauge pressure in the hearth, the velocity of the wind, at the tuyère nose, is about 950 ft./sec., and its hydrodynamic impact pressure is 3.3 lbs./sq. in. At this very considerable pressure the blast forces back the lumps of coke and tends to produce a so-called "gassy tuyère." Substitution of 3½" tuyères for the 4" tuyères makes possible raising the jet impact pressure to 5.65 lbs./in., and desirably extends the combustion. Employment of such high jet velocities is limited by consideration of blowing equipment available, of power consumption, etc.

Perhaps the most convenient and positive of all the methods listed above for limiting the free energy of reduction in the hearth, and the one which is most easily controlled, is the introduction of added moisture into the blast. In the above operation I prefer to reduce the burden to 26,800 lbs. of ore and 7175 lbs. of coke per round, to hold the blast temperature at 1900° F., and to introduce 102 lbs. of steam per minute into the hot blast main. This represents about 20 boiler horse power, and is an insignificant demand on the boiler room. I prefer to jet this moisture as boiler steam into the hot blast main at a point near the stove end, in order to permit diffusion of air and steam before the blast reaches the bustle pipe. The wetted blast here contains 11% by volume of $H_2O$, consumes 3.3% of the carbon being burned at the tuyères, and absorbs heat equivalent to one hundred degrees of hot blast. That is to say, the introduction of 11% of $H_2O$ vapor into the blast is the thermal equivalent of lowering the blast temperature 100° F. Its operating advantage lies in the ease and speed with which its effect can be controlled.

With the flow of steam into the hot blast main controlled by a valve, I can sight an optical pyrometer down the tuyère, open the steam valve, and the added moisture arrives at the tuyère nose within 1/20 of a second of the time of valve opening; the moisture completes its reaction with hot carbon in the tuyère zone within ½ second, being converted into $CO$ and $H_2$, and the complete effect of the steam can be observed with substantially no delay.

A further operating advantage accrues from providing individual steam connections to the goose necks, or blow pipes, of the tuyères, and introducing 12 lbs. of steam per minute into each tuyère for predetermined periods of time. Thereby the degree of control possible over intensity of reduction may be considerably enhanced.

I claim:

1. Process which comprises charging oxidic manganese-iron ore and solid fuel into a blast furnace; blasting the charge with preheated air; maintaining the upper surface of the resulting slag bath at a level within the zone of direct influence of the oxidizing constituents of the blast, whereby the normal reduction intensity of the furnace hearth is lessened and a molten slag containing some FeO and at least 70% of the total manganese content of the ore in non-metallized form and a molten pig iron product are produced; and tapping off the slag and the molten pig iron product.

2. Process for the simultaneous production of pig iron and a slag containing oxide of manganese and oxide of iron in a ratio of at least 8 to 1 from an oxidic manganese-iron ore containing said oxides in a lesser ratio, which comprises charging manganese iron ore and solid fuel into a blast furnace; adjusting the components of the charge to yield a strongly "acid" slag high in silicates; blasting the charge with preheated air; and maintaining the upper surface of the resulting slag bath at a level within the zone of direct influence of the oxidizing constituents of the blast, whereby the normal reduction intensity of the furnace hearth is lessened and a molten slag containing some FeO and at least 70% of the total manganese content of the ore in non-metallized form and a molten pig iron product are produced.

3. Process which comprises charging oxidic manganese-iron ore and solid fuel into a blast furnace in a non-uniform manner such that the proportion of ore to fuel in the several locations in a horizontal plane in the shaft of the furnace differs materially from the average ratio of ore to fuel in said horizontal plane, and non-uniform flow of gases upwardly through the shaft and non-uniform descent of the charge are brought about, and blasting the charge with preheated air; whereby the normal reduction intensity of the furnace hearth is lessened and a molten slag containing some FeO and at least 70% of the total manganese content of the ore in non-metallized form and a molten pig iron product are produced.

4. In the process of producing molten pig iron and a molten slag by heating oxidic manganese-iron ore with solid fuel, the improvement which comprises blasting a charge of the ore and fuel in a blast furnace with preheated air admitted into the furnace charge as a high velocity jet having a jet velocity in excess of 700 cubic feet per second, whereby the normal reduction intensity of the furnace hearth is lessened and a molten slag containing some FeO and at least 70% of the total manganese content of the ore in non-metallized form and a molten pig iron product are produced.

5. In the process of producing molten pig iron and a molten slag rich in manganese compounds by heating oxidic manganese-iron ore with solid fuel, the improvement which comprises establishing and maintaining in the shaft of a blast furnace a charge column consisting of a mixture of the ore and the fuel, blasting the charge with preheated air, and maintaining the charge column so short that raw ore from the charge is injected into the fluid bath of the furnace hearth.

6. Process which comprises charging oxidic manganese-iron ore and solid fuel into a blast furnace; blasting the charge with preheated air; maintaining the upper surface of the resulting slag bath at a level within the zone of direct influence of the oxidizing constituents of the blast, whereby the normal reduction intensity of the furnace hearth is lessened and a molten slag containing more than 1% FeO and a molten pig iron product are produced; and tapping off the slag and the molten pig iron product.

7. In the process of smelting oxidic manganese-iron ores in the blast furnace the improvement which comprises blowing a preponderance of the total blast through the tuyères of one side of the furnace, whereby non-uniform descent of the charge is effected.

PERCY H. ROYSTER.